(12) United States Patent
Gurcan (10) Patent No.: US 7,952,337 B2
(45) Date of Patent: May 31, 2011

(54) HYBRID DC-DC SWITCHING REGULATOR CIRCUIT

(75) Inventor: Hakan Ates Gurcan, Los Gatos, CA (US)

(73) Assignee: Decicon, Inc., San Jose, CA (US)

( * ) Notice: Subject to any disclaimer, the term of this patent is extended or adjusted under 35 U.S.C. 154(b) by 267 days.

(21) Appl. No.: 11/957,305

(22) Filed: Dec. 14, 2007

(65) Prior Publication Data
US 2008/0150500 A1 Jun. 26, 2008

Related U.S. Application Data

(60) Provisional application No. 60/870,567, filed on Dec. 18, 2006.

(51) Int. Cl.
G05F 1/00 (2006.01)
(52) U.S. Cl. .................................... 323/282
(58) Field of Classification Search .................. 323/241, 323/271, 280–283
See application file for complete search history.

(56) References Cited

U.S. PATENT DOCUMENTS

| | | | | |
|---|---|---|---|---|
| 2,220,099 A * | 11/1940 | Fritz et al. | ............... | 562/93 |
| 3,020,099 A * | 2/1962 | Smith | ............... | 384/191.2 |
| 6,046,577 A * | 4/2000 | Rincon-Mora et al. | ....... | 323/282 |
| 6,160,325 A * | 12/2000 | Turvey | ............... | 307/125 |
| 6,201,375 B1 * | 3/2001 | Larson et al. | ............... | 323/277 |
| 6,246,221 B1 * | 6/2001 | Xi | ............... | 323/280 |
| 6,246,222 B1 * | 6/2001 | Nilles et al. | ............... | 323/283 |
| 6,388,433 B2 * | 5/2002 | Marty | ............... | 323/284 |
| 6,437,638 B1 * | 8/2002 | Coles et al. | ............... | 327/540 |
| 6,674,274 B2 * | 1/2004 | Hobrecht et al. | ............... | 323/285 |
| 6,677,735 B2 * | 1/2004 | Xi | ............... | 323/273 |
| 6,696,882 B1 * | 2/2004 | Markowski et al. | ......... | 327/531 |
| 6,839,252 B2 * | 1/2005 | Tai et al. | ............... | 363/65 |
| 6,856,124 B2 * | 2/2005 | Dearn et al. | ............... | 323/280 |
| 6,933,772 B1 * | 8/2005 | Banerjee et al. | ............... | 327/541 |
| 6,977,489 B2 * | 12/2005 | Isham | ............... | 323/272 |
| 6,989,659 B2 * | 1/2006 | Menegoli et al. | ............... | 323/274 |
| 7,009,348 B2 * | 3/2006 | Mogilner et al. | ............... | 315/307 |
| 7,102,394 B1 * | 9/2006 | Wilson et al. | ............... | 327/54 |
| 7,109,691 B2 * | 9/2006 | Brooks et al. | ............... | 323/282 |

(Continued)

OTHER PUBLICATIONS

Linear Technology—LTC3025 300mA Micropower VLDO Linear Regulator, Data Sheet, Copyright 2004, pp. 1-12, Linear Technology Corp.*
Requirement for Restriction/Election for U.S. Appl. No. 11/957,357, mailed on Oct. 30, 2009, 9 pages. available via PAIR).*
Non-Final Office Action for U.S. Appl. No. 11/957,357, mailed on Mar. 25, 2010, BA, pages. available via PAIR).*

(Continued)

*Primary Examiner* — Adolf Berhane
*Assistant Examiner* — Yemane Mehari
(74) *Attorney, Agent, or Firm* — Kilpatrick Townsend & Stockton LLP; Ardeshir Tabibi (57) ABSTRACT

A switching voltage regulator circuit includes, in part, a latch, a pair of switches, a sensing circuit, an amplifier, a digital control block, and a comparator. The switches are responsive to the latch, and the sensing circuit is responsive to a current flowing through the switch that is on. The amplifier is responsive to a reference voltage signal and a voltage feedback signal to generate a first intermediate voltage signal. The digital control block receives the reference voltage signal and the voltage feedback signal and generates a second intermediate voltage signal operative to cause the difference between the voltage feedback signal and the reference voltage signal to be less than a predefined value. The first and second intermediate voltages define a threshold value. The comparator is adapted to receive the output of the sensing circuit and the threshold value and to change the state of the latch in response.

6 Claims, 5 Drawing Sheets

U.S. PATENT DOCUMENTS

| | | | | |
|---|---|---|---|---|
| 7,167,054 B1* | 1/2007 | Dening et al. | | 330/297 |
| 7,262,658 B2* | 8/2007 | Ramaswamy et al. | | 330/251 |
| 7,304,464 B2* | 12/2007 | Weng et al. | | 323/285 |
| 7,327,127 B2* | 2/2008 | Ho | | 323/271 |
| 7,333,348 B2* | 2/2008 | Horiuchi et al. | | 363/16 |
| 7,342,392 B2* | 3/2008 | Liao | | 323/282 |
| 7,348,840 B2* | 3/2008 | Magrath et al. | | 330/10 |
| 7,414,471 B2* | 8/2008 | Krishnan et al. | | 330/251 |
| 7,486,058 B2* | 2/2009 | Szepesi | | 323/272 |
| 7,501,801 B2* | 3/2009 | Brown et al. | | 323/224 |
| 7,531,996 B2* | 5/2009 | Yang et al. | | 323/282 |
| 2007/0114985 A1* | 5/2007 | Latham et al. | | 323/283 |
| 2008/0150368 A1* | 6/2008 | Gurcan | | 307/82 |
| 2008/0150500 A1* | 6/2008 | Gurcan | | 323/271 |
| 2008/0157740 A1* | 7/2008 | Gurcan | | 323/283 |
| 2008/0174289 A1* | 7/2008 | Gurcan et al. | | 323/280 |
| 2009/0015066 A1* | 1/2009 | Guo et al. | | 307/31 |

OTHER PUBLICATIONS

Non-Final Office Action for U.S. Appl. No. 11/956,070, mailed on B Sep. 22, 2009, 9 pages. available via PAIR).*
Non-Final Office for U.S. Appl. No. 11/939,377, mailed on Nov. 16, 2009.*
U.S. Appl. No. 12/729,142, filed Mar. 22, 2010, Gurcan.
Linear Technology—LTC3025 300mA Micropower VLDO Linear Regulator, Data Sheet, Copyright 2004, pp. 1-12, Linear Technology Corp.
Non-Final Office Action for U.S. Appl. No. 11/957,357, mailed on Mar. 25, 2010, 7 pages. (available via PAIR).
Non-Final Office for U.S. Appl. No. 11/956,070, mailed on Sep. 22, 2009, 9 pages. (available via PAIR).
Non-Final Office for U.S. Appl. No. 11/939,377, mailed on Nov. 16, 2009, 8 pages. (available via PAIR).

* cited by examiner

HYBRID DC-DC SWITCHING REGULATOR CIRCUIT

CROSS-REFERENCES TO RELATED APPLICATIONS

The present application claims benefit under 35 USC 119 (e) of U.S. Provisional Application No. 60/870,567, filed on Dec. 18, 2006, entitled "Hybrid DC-DC Switching Regulator Circuit," the content of which is incorporated herein by reference in its entirety.

BACKGROUND OF THE INVENTION

The present invention relates to electronic circuits, and more particularly to power supply integrated circuits.

In integrated circuits (IC), there is often a need to generate a regulated DC voltage from a unregulated DC supply voltage. One known circuit for achieving this is commonly referred to as pulse width modulated (PWM) regulator. Such a regulator often uses a feedback loop to maintain its output voltage equal to a reference voltage and to maintain stability in the loop.

BRIEF SUMMARY OF THE INVENTION

A switching voltage regulator circuit, in accordance with one embodiment of the present invention includes, in part, a latch, a pair of switches, a sensing circuit, an amplifier, a digital control block, and a comparator. The switches are responsive to the latch, and the sensing circuit is responsive to a current flowing through the switch that is on. The amplifier is responsive to a reference voltage signal and a voltage feedback signal to generate a first intermediate voltage signal. The digital control block is adapted to receive the reference voltage signal and the voltage feedback signal and to generate, in response, a second intermediate voltage signal operative to cause the difference between the voltage feedback signal and the reference voltage signal to be less than a predefined value. The first and second intermediate voltages define a-threshold value. The comparator is adapted to receive the output of the sensing circuit and the threshold value and to change the state of the latch in response.

In one embodiment, the feedback voltage is generated by dividing the output voltage. In another embodiment, the feedback voltage is the output voltage. In one embodiment, the first and second switches are MOS transistors. In another embodiment, the first and second switches are bipolar transistors.

In one embodiment, the digital control block further includes, in part, an analog-to-digital converter, a digital control engine responsive to the analog-to-digital converter and adapted to cause the difference between the voltage feedback signal and the first reference voltage signal to be less than a predefined value, and a digital-to-analog converter responsive to the digital control block. In one embodiment, the voltage regulator includes a memory, and a clock and timing signal generation block. In one embodiment, the digital control block generates a biasing signal.

A switching voltage regulator circuit, in accordance with another embodiment of the present invention includes, in part, a digital control block and N voltage regulation channels. The digital control block receives a first reference voltage and selectively receives one of N feedback voltages, and generates a first intermediate voltage signal operative to cause the difference between the selected feedback voltage and the reference voltage to be less than a predefined value. Each voltage regulation channel includes, in part, a latch, first and second associated switches responsive to an output of the latch; a sensing circuit associated with the first and second switches and responsive to a current flow through the associated switches, an associated amplifier responsive to a reference voltage signal and an associated voltage feedback signal to generate an associated second intermediate voltage signal, and a comparator adapted to receive the output of the associated sensing circuit and further to receive a threshold value defined by the first intermediate voltage signal and the associated second intermediate voltage signal to change the state of the latch in response.

In one embodiment, each feedback voltage is generated by dividing an associated output voltage. In another embodiment, each feedback voltage represents the associated output voltage. In one embodiment, the first and second switches in each channel are MOS transistors. In another embodiment, the first and second switches in each channel are bipolar transistors. In one embodiment, the digital control block comprises an analog-to-digital converter, a digital control engine responsive to said analog-to-digital converter and adapted to cause the difference between the feedback voltage signal and the first reference voltage to be less than a predefined value, and a digital-to-analog converter responsive to said digital control block.

DETAILED DESCRIPTION OF THE INVENTION

Figure 1:
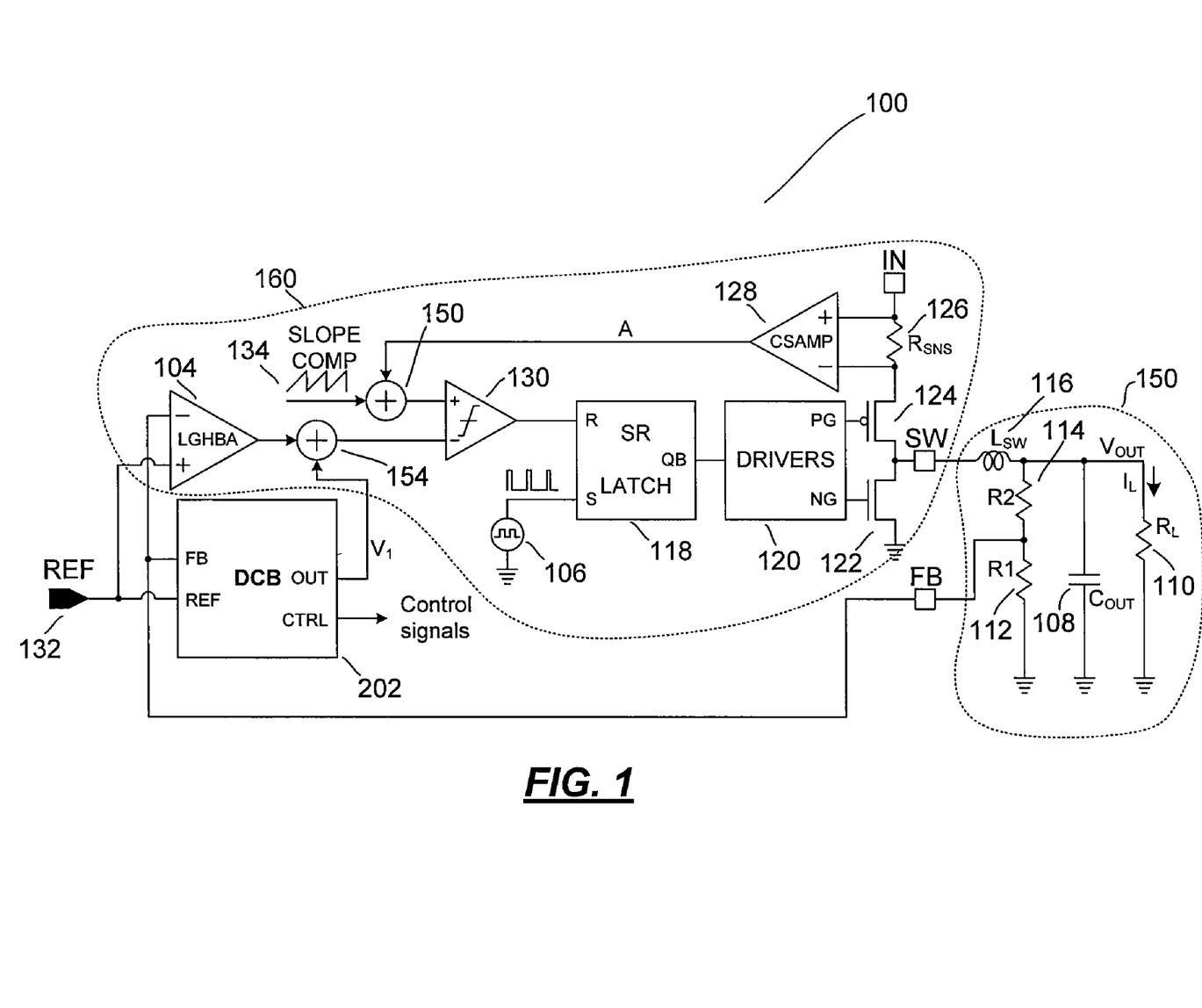
FIG. 1 is a block diagram of a hybrid DC-DC switching regulator circuit, in accordance with one embodiment of the invention.

FIG. 1 is a block diagram of a hybrid DC-DC switching regulator circuit 100, in accordance with one embodiment of the invention. DC-DC switching regulator circuit 100, hereinafter alternatively referred to as regulator 100, includes a control loop 160 and a digital control block 202. The short term loop transient response of regulator 100 is determined by the control loop 160, and the DC accuracy of regulator 100 is provided by a relatively slower feedback loop built around DCB 202. Although the following description is provided with reference to a buck regulator, it is understood that any other switching regulator topology, such as boost, buck-boost, or otherwise may be used.

The switching cycle begins when oscillator 106 sets the SR latch 118. The output signal of SR Latch 118 is buffered by one or more drivers disposed in driver block 120 and applied to the low side switch (LSS) 122 and the high side switch (HSS) 124. Switch 124 is shown as being a PMOS transistor 124, and switch 122 is shown as being an NMOS transistor 122. In other embodiments, switches 122 and 124 may be bipolar NPN and PNP transistors, or both switches may be NMOS or NPN transistors. When the SR latch 118 is set, transistor 122 is turned off and transistor 124 is turned on. The current through transistor 124 is equal to the current $I_{ind}$ flowing through inductor 116. The resistance of resistors 112 and 114 are selected to be large enough so that the average value of the current through inductor 116 is nearly equal to the load current $I_L$ flowing through load resistor 110.

The voltage developed across sense resistor 126 is proportional to the inductor current $I_{ind}$. Current sense amplifier 128 senses the current flowing through resistor 126 and generates a voltage in response. To avoid sub-harmonic oscillations when the duty-cycle is larger than 50%, adder 150 adds a slope compensation signal 134 to the output signal A of current sense amplifier 128 and delivers the resulting signal to the positive input terminal of comparator 130. The voltage signal applied to the positive input terminal of comparator 130 is compared to a threshold voltage applied to the negative input terminal of comparator 130. As the inductor current builds up, at some point the voltage at the positive input of comparator 130 becomes larger than this threshold voltage and the comparator 130 trips, causing SR latch 118 to be reset. When SR latch 118 is reset, transistor 124 is turned off and transistor 122 is turned on. The cycle repeats itself when the next clock pulse from oscillator 106 sets latch 118. This method of control is known as peak current control. Other types of current mode control methods may be employed in the current loop, such as constant ON time control, constant OFF time control, etc.

The threshold voltage level applied to the negative input terminal of comparator 130 is supplied, in part, by amplifier 104, and as a function of the difference between reference voltage $V_{REF}$ (132) and the feedback voltage $V_{FB}$. Amplifier 104 is a low-gain high-bandwidth amplifier (LGHBA) which together with current sense amplifier 126, comparator 130, latch 118, driver 120 and switches 122 and 124 form a low gain, high bandwidth loop 160 which is responsible for the fast transient response of regulator 100.

Figure 2:
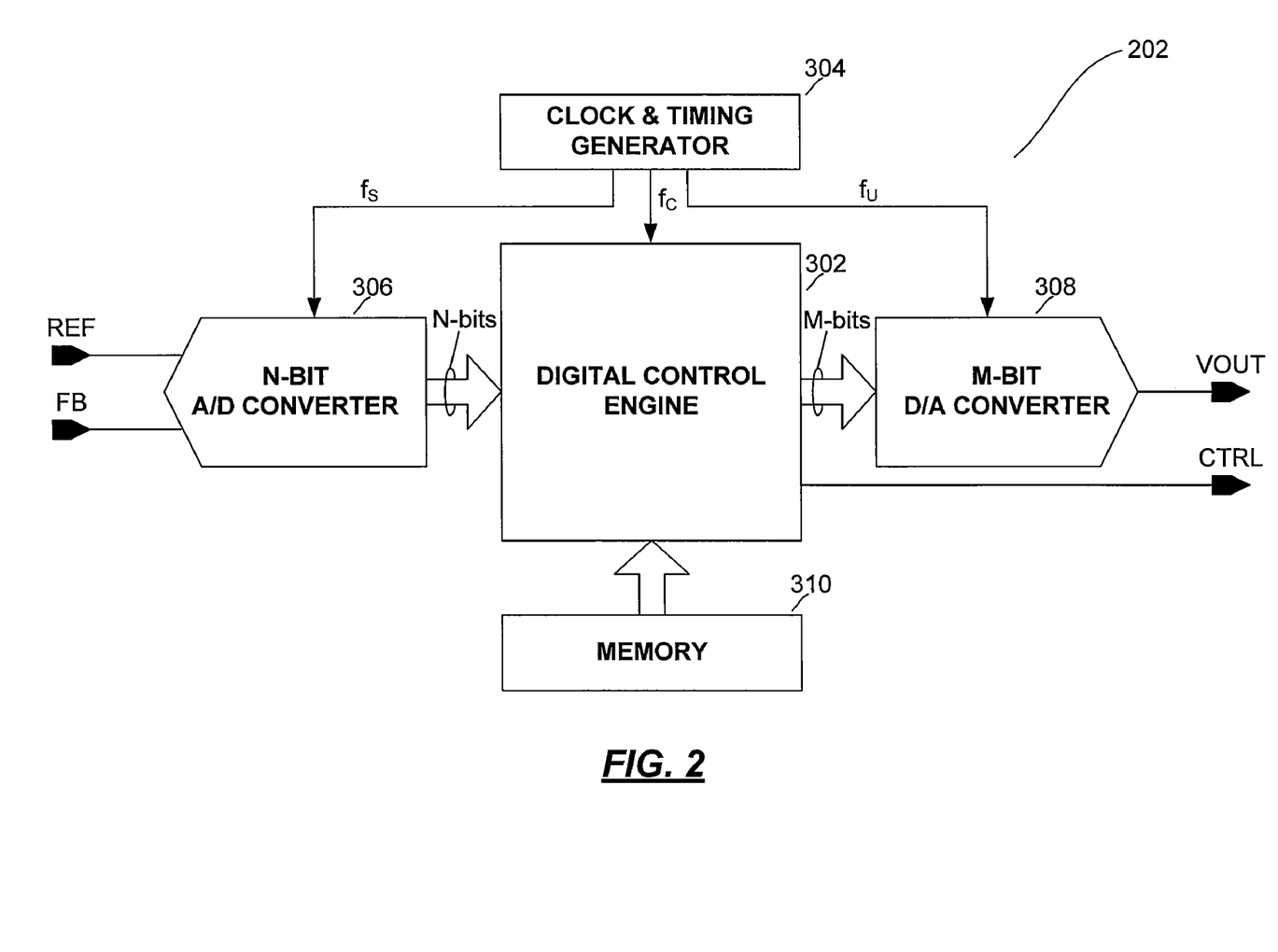
FIG. 2 is a block diagram of the digital control block of FIG. 1, in accordance with one embodiment of the present invention.

FIG. 2 is a block diagram of DCB 202, in accordance with one embodiment of the present invention. Referring concurrently to FIGS. 1 and 2, N-Bit Analog-to-Digital Converter (ADC) 306 is shown as having differential inputs and a sampling rate of $f_S$. In other embodiments, described below, ADC 306 may have a single-ended input. ADC 306 samples the voltage difference between reference voltage VREF and feedback voltage VFB and converts this difference to a corresponding N-bit wide digital code word at its output.

The Digital Control Engine (DCE) 302 receives the N-bit wide digital code word from ADC 306 and processes it according to a control algorithm to provide an M-bit wide digital code word that is supplied to Digital-to-Analog Converter (DAC) 308. The algorithm implemented by DCE 302 may be a digital filter algorithm mimicking the behavior of a high-gain low-bandwidth amplifier, such as an integrator, or may be a non-linear function adapted to bring the feedback voltage $V_{FB}$ close to reference voltage $V_{REF}$ such that the difference between voltages $V_{FB}$ and $V_{REF}$ is less than a predefined value. DAC 308 uses the M-bit word to bring the output voltage VOUT back into regulation using the slower time constants of the Digital Feedback Loop (DFL). The resolution of ADC 306, i.e., N, is typically selected so as to be less than the DAC 308 resolution, i.e., M, to avoid limit cycling of the output voltage. DAC 308 generates an analog voltage signal at its output in response to the M-bit wide digital code word it receives at its input. The voltage generated by DAC 308 is added by adder 154 to the output voltage signal of amplifier 104 and establishes the threshold voltage level applied to the negative input terminal of comparator 130. Signal CTRL generated by DCE 302 is optionally used to control the operations of one or more blocks of the voltage regulation of the present invention. For example, signal CTRL may be used to set the bias currents/voltages to optimize the performance of the various analog blocks disposed in control loop 160 of the present invention to account for environment parameters, external component values and operating conditions. In one embodiment (not shown), signal CTRL is used to optimize the operating condition of amplifier 104.

Memory 310 supplies information to DCE 302. Although not shown, in one embodiment, memory 310 includes a non-volatile (NVM) and a volatile Memory (VM). The NVM may be used to store such data as, e.g., calibration information, loop parameters, external component values and parameters for the programmable features of the regulator that are desired to be retained in case of a power loss. VM may be used as a scratch pad by the DCE 302 and may also store run-time status information. The Clock & Timing Generator 304 generates the timing signals for the ADC 306, DCE 302, DAC 308, and memory 310.

Figure 3A:
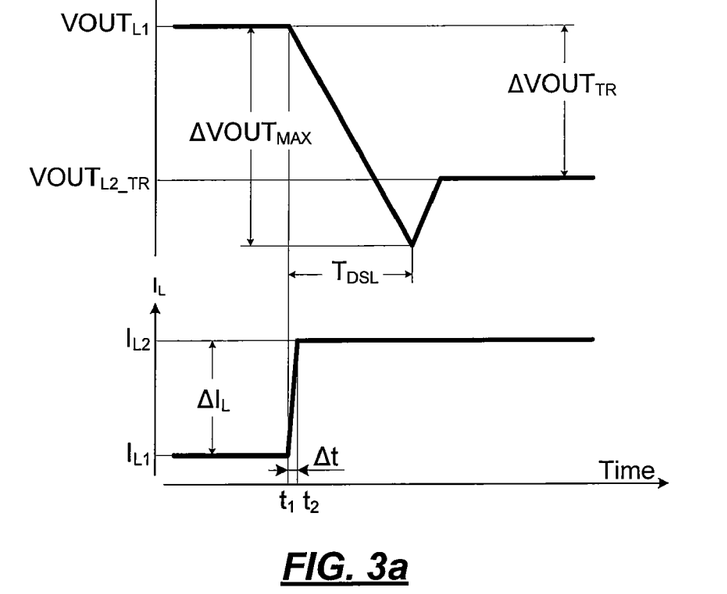
FIG. 3A illustrates the short-term transient response of the output voltage of the hybrid DC-DC switching regulator of FIG. 1.

Referring to FIG. 1, in order to describe the operation of the control loop 160 and external components 150, assume that the load current $I_L$ changes from a low level $I_{L1}$ to a higher level $I_{L2}$ in a time interval $\Delta t$ that is small compared to the response time TDSL of loop 160 (fast load transient). Further assume that resistor 114 has a resistance of 0, and resistor 112 is an open circuit. Further assume that the voltage $V_1$ supplied at the output terminal OUT of DCB 202 remains relatively constant within time intervals in the order of $T_{DSL}$. This is a valid assumption, since the response time $T_{DDCB}$ of the DCB 202 is selected to be larger than that of loop 160 so as to provide a relatively slow response and a high gain. This output load transient event is illustrated in FIG. 3a. A voltage ripple which is expected to be present on the output voltage of a switching regulator is omitted for clarity.

When a large load current transient is applied to the output, it causes on the output voltage (i) a voltage spike induced by the Equivalent Series Inductance ESL (not shown) of the output capacitor 108, (ii) an offset voltage induced by the Equivalent Series Resistance ESR (not shown) of the output capacitor 108 and (iii) a voltage droop caused by the loop response time. The effects of $L_{ESL}$ and $R_{ESR}$ can be kept relatively small by proper selection of external components and by following proper layout techniques. As an example, a load current step of 0 to 100 mA in 100 ns would cause a peak output voltage deviation of 1 mV due to 1 nH of ESL. The contribution of ESR to the transient output voltage deviation is also relatively small. As an example, a load current step of 0 to 100 mA would cause a peak output voltage deviation of 1 mV due to 10 mΩ of ESR. The voltage droop is caused by the non-zero loop response time $T_{DSL}$. Assuming that $\Delta I_L$ is the difference between $I_{L2}$ and $I_{L1}$, the following approximation can be written about the droop rate:

$$d(VOUT)/dt = \Delta I_L / C_{OUT} \quad (1)$$

During the period $T_{DSL}$ of loop 160, the load current is supplied by $C_{OUT}$. At the end of $T_{DSL}$, the maximum output voltage deviation from the initial regulation value of $VOUT_{L1}$ may be written as:

$$\Delta VOUT_{MAX} = \Delta I_L * T_{DSL} / C_{OUT} \quad (2)$$

After the expiration of $T_{DSL}$, sub-loop 160 catches up with the droop and brings the output voltage to $VOUT_{L2\_TR}$, as shown by the following expression.

$$\Delta VOUT_{TR} = VOUT_{L1} - VOUT_{L2\_TR} \cong \Delta I_L * R_{SNS} * A_{CSAMP} / A_{LGHBA} \quad (3)$$

In expression (3), $A_{LGHBA}$ is the voltage gain of amplifier 104, $A_{CSAMP}$ is the voltage gain of current sense amplifier 128, and $R_{SNS}$ is the resistance of resistor 126. $\Delta VOUT_{TR}$ represents the transient load regulation characteristic of regulator 100. In expression (3), slope compensation signal 134 is omitted since its effect is relatively small at large current levels.

The following are exemplary numerical values of a few parameters associated with regulator 100:

$I_{L1}$=50 mA
$I_{L2}$=500 mA
$A_{LGHBA}$=2
$A_{CSAMP}$=4
$R_{SNS}$=50 mΩ
$T_{DSL}$=150 ns
$C_{OUT}$=1 µF
d(VOUT)/dt=450 mV/µs
$\Delta VOUT_{MAX}$=67.5 mV
$\Delta VOUT_{TR}$=45 mV The above example shows that the loop 160 is able to catch the output voltage after a droop of 67.5 mV in response to a fast-load transient from 50 mA to 500 mA. If the load transient duration is longer than the response time, the loop 160 will be able to keep up with the changing load current demand at the output and consequently $\Delta VOUT_{MAX}$ will be equal to $\Delta VOUT_{TR}$.

Figure 3B:
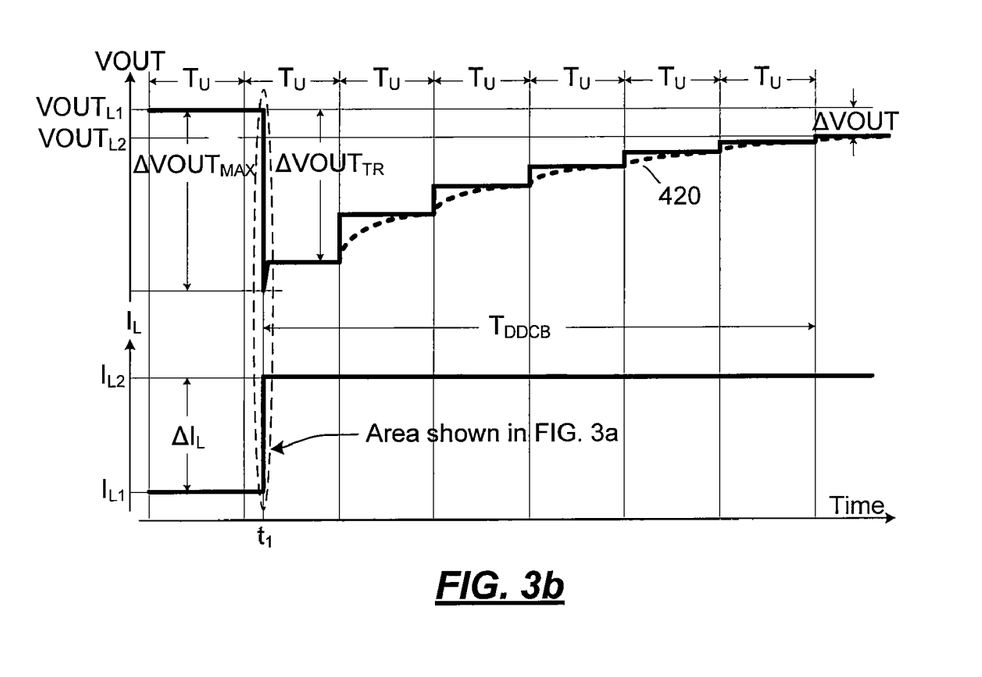
FIG. 3B illustrates the long-term transient response of the output voltage of the hybrid DC-DC switching regulator of FIG. 1.

After these initial events and following the load transient, DCB 202, which has a response time of $T_{DDCB}$, brings the output voltage back to DC regulation as illustrated in FIG. 3B. This is accomplished by DAC 308 (FIG. 2) updating the voltage at the output node of the DCB 202 at a rate of $f_U$ updates per second ($T_U$=1/$f_U$ in FIG. 3B). The output will be brought back to within $\Delta$VOUT of $VOUT_{L1}$ after a time period of $T_{DDCB}$ by the slower digital feedback loop that includes DCB 202. Assuming that the equivalent DC gain of DCB 202 from the input of ADC 306 to the output of DAC 308 is $A_{DCB}$, $\Delta$VOUT may be calculated from the expression below:

$$\Delta VOUT = \Delta I_L * R_{SNS} * A_{CSAMP}/(A_{LGHBA} * A_{DCB}) \qquad (4)$$

As an example assume that $A_{DCB}$ is equal to 50, accordingly:

$$\Delta VOUT = (45\ mV)/(50\ V/V) = 0.9\ mV$$

If smoother transitions are desired at the output between DAC updates, a smoothing circuit (not shown) can be coupled to the output of DAC 308 output. For example, an RC low pass filter may be used to provide the smoothing function. The resulting output voltage waveform when such a smoothing circuit is used is shown in FIG. 4B as dotted lines 420. In one embodiment, ADC 306 has a single-ended input and may sample the signals REF and FB signals at different times, store them in MEM 310, and compute the difference in digital domain. In another embodiment, the difference between the values of signals REF and FB may be determined by an analog signal conditioning circuit. The output of the signal conditioning circuit is then applied to the single-ended ADC 306.

Figure 4:
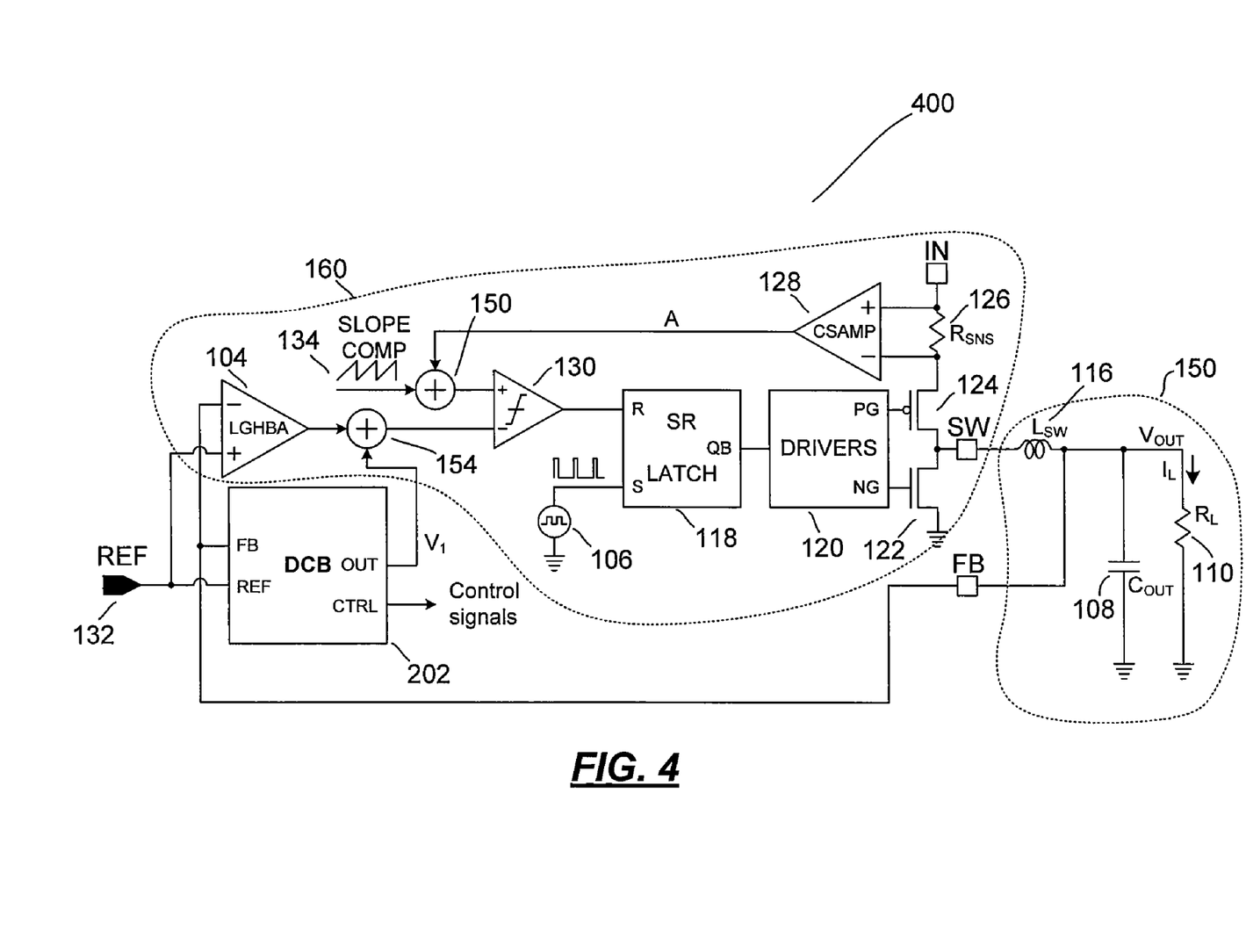
FIG. 4 is a block diagram of a hybrid DC-DC switching regulator circuit, in accordance with another embodiment of the invention.

FIG. 4 is a block diagram of an regulator 400, in accordance with another embodiment of the present invention. In regulator 400, DCB 302 samples the output voltage $V_{OUT}$ directly and without using a voltage divider.

Figure 5:
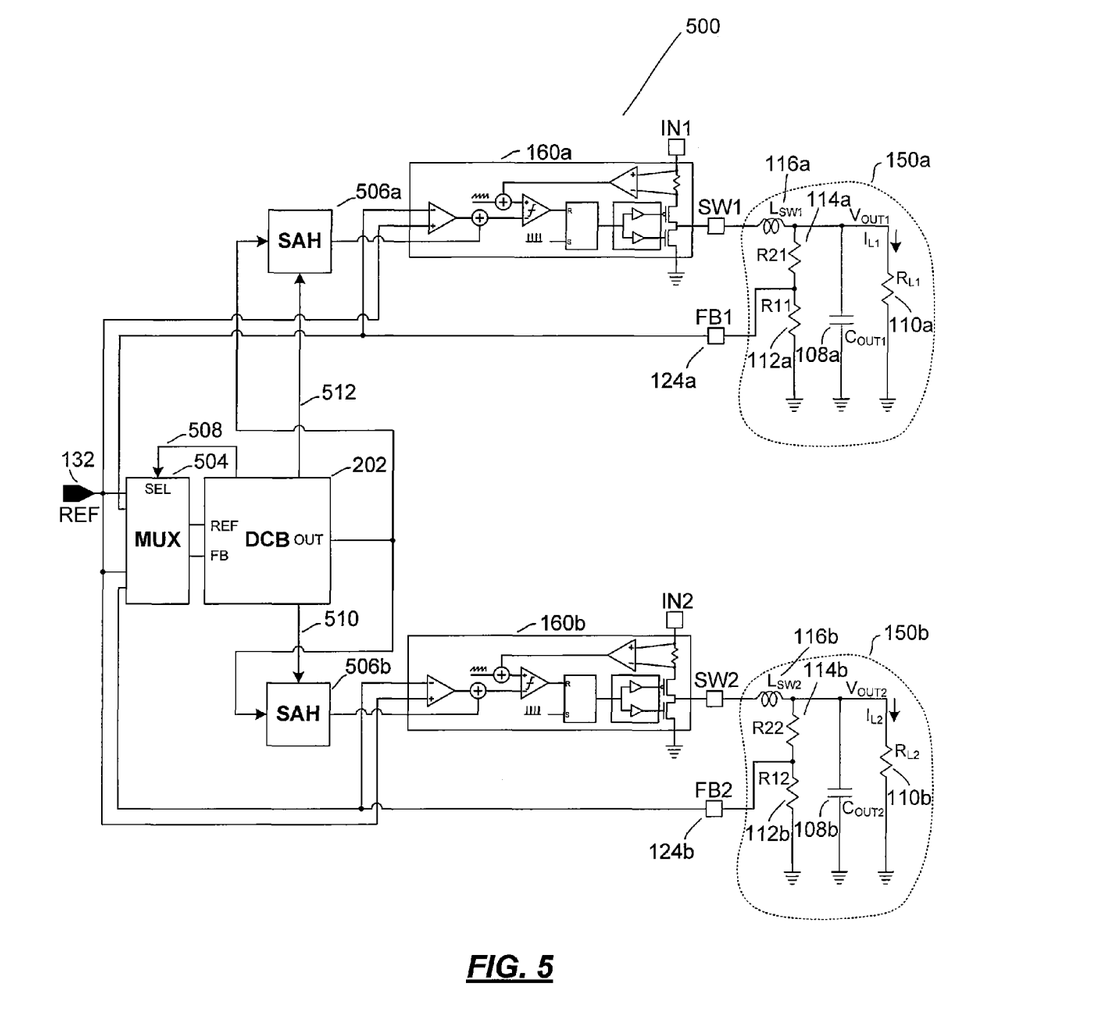
FIG. 5 is a schematic diagram of a multi-channel DC-DC switching regulator circuit, in accordance with another embodiment of the present invention.

FIG. 5 is a schematic diagram of a regulator 500, in accordance with another embodiment of the present invention. As shown in FIG. 5, in regulator 500, DCB 202 is shown as controlling two output voltages $V_{OUT1}$ and $V_{OUT2}$, respectively at output terminals OUT1 and OUT2 using a time domain multiplexing scheme. Multiplexer (MUX) 504 selects the error signal from either FB1 or FB2 and supplies the selected signal to DCB 202. DCB 202 supplies its output signal OUT to one of the sample-and-hold (SAH) blocks 506a and 506b. In other words, if signal FB1 from terminal 124a is selected by Mux 504, output signal OUT of DCB 202 is supplied to SAH 506a. If, on the other hand, mux 504 selects signal FB2 from terminal 124b, output signal OUT of DCB 202 is supplied to SAH 506b. The select signal Sel of MUX 504 is supplied by DCB 202 via signal line 508. Signals 510 and 512 are used to control the sampling and holding functions of the sample-and-hold blocks 506a and 506b. Additionally, the ADC, DAC, DCE in the DCB, can be further utilized by other purposes when they are needed to process Hybrid DC-DC converter data, such as diagnostics, supervisory functions, and communications. Although not shown, the time multiplexing of the DCB may be extended to more than two voltage regulation channels.

By assigning the responsibilities of DC performance and of transient performance onto two separate feedback paths, the present invention makes it possible to independently optimize the performance of each path, resulting in a Hybrid DC-DC Switching Regulator that is fast and accurate.

The above embodiments of the present invention are illustrative and not limiting. Various alternatives and equivalents are possible. The invention is not limited by the type of amplifier, pulse-width generator, feedback circuit, configuration matrix, switch, etc. The invention is not limited by the type of integrated circuit in which the present invention may be disposed. Nor is the invention limited to any specific type of process technology, e.g., CMOS, Bipolar, or BICMOS that may be used to manufacture the present invention. Other additions, subtractions or modifications are obvious in view of the present disclosure and are intended to fall within the scope of the appended claims.

What is claimed is:

1. A switching voltage regulator circuit adapted to supply N regulated output voltages, the voltage regulator circuit comprising:
   a digital control block operative to receive a first reference voltage and selectively receive one of N feedback voltages, said digital control block adapted to generate a first intermediate voltage signal operative to cause the difference between a selected one of N feedback voltages and the reference voltage to be less than a predefined value, said digital control block comprising:
      an analog-to-digital converter;
      a digital control engine responsive to said analog-to-digital converter and adapted to cause the difference between the feedback voltage signal and the first reference voltage to be less than a predefined value; and
      a digital-to-analog converter responsive to said digital control block;
   N voltage regulation channels, each voltage regulation channel comprising:
      a latch;
      first and second associated switches responsive to an output of the latch; said first and second switches disposed between first and second supply voltages and having a common node;
      an associated sensing circuit responsive to a current flow through the associated first or second switches;
      an associated amplifier responsive to a reference voltage signal and an associated voltage feedback signal to generate an associated second intermediate voltage signal;
      a comparator adapted to receive the output of the associated sensing circuit and further to receive a threshold value defined by the first intermediate voltage signal and the associated second intermediate voltage signal to change a state of the latch in response.

2. The switching voltage regulator circuit of claim 1 wherein at least one of the feedback voltages is generated by dividing an associated output voltage.

3. The switching voltage regulator circuit of claim 1 wherein at least one of the feedback voltages is the associated output voltage.

4. The switching voltage regulator circuit of claim 1 wherein said first and second switches in each channel are MOS transistors.

5. The switching voltage regulator circuit of claim 1 wherein said first and second switches in each channel are bipolar transistors.

6. The switching voltage regulator circuit of claim 1 wherein said digital control block further comprises:
   a memory; and
   a clock and timing signal generation block.

* * * * *